US009718111B2

(12) United States Patent
Eaton

(10) Patent No.: US 9,718,111 B2
(45) Date of Patent: Aug. 1, 2017

(54) ONE-PIECE FINTUBE SOLAR HEATING ELEMENT

(76) Inventor: Douglas W. Eaton, Lexington, KY (US)

(*) Notice: Subject to any disclaimer, the term of this patent is extended or adjusted under 35 U.S.C. 154(b) by 888 days.

(21) Appl. No.: 13/396,304

(22) Filed: Feb. 14, 2012

(65) Prior Publication Data

US 2012/0205087 A1 Aug. 16, 2012

Related U.S. Application Data

(60) Provisional application No. 61/463,156, filed on Feb. 14, 2011.

(51) Int. Cl.
*F28F 1/20* (2006.01)
*B21D 53/06* (2006.01)
*B21D 5/10* (2006.01)
*F24J 2/26* (2006.01)

(52) U.S. Cl.
CPC ............. *B21D 53/06* (2013.01); *B21D 5/10* (2013.01); *F24J 2/26* (2013.01); *F28F 1/20* (2013.01); *Y02E 10/44* (2013.01); *Y10T 29/49355* (2015.01)

(58) Field of Classification Search
CPC . B21D 53/06; B21D 5/10; B21D 53/08; F24J 2/26; F24J 2002/261; Y20T 29/49355; Y02E 10/44; F28F 1/20
USPC .... 165/181, 183, 185; 29/890.033, 890.045; 72/51
See application file for complete search history.

(56) References Cited

U.S. PATENT DOCUMENTS

| 1,993,065 A | * | 3/1935 | Light | B21C 37/225 138/171 |
| 2,203,006 A | * | 6/1940 | Young | A47G 25/36 138/141 |
| 2,711,382 A | * | 6/1955 | Smith-Johannsen | B21D 53/04 156/227 |
| 3,294,162 A | * | 12/1966 | Loehlein | B21D 53/04 165/172 |
| 4,150,657 A | | 4/1979 | Bowen | |
| 4,237,971 A | * | 12/1980 | Olsson | B21D 53/045 126/661 |
| 4,313,430 A | * | 2/1982 | Britner | F24J 2/265 126/659 |
| 4,326,583 A | * | 4/1982 | Rudd | B21D 53/08 165/183 |
| 4,333,545 A | * | 6/1982 | Roberts | F01N 13/185 138/151 |

(Continued)

OTHER PUBLICATIONS

Thermafin Holding, LLC—Welding Fintube Products; "Advantages"; http://www.thermafin.com/fin_adv.shtml; 2 pages; 2006.

(Continued)

*Primary Examiner* — Len Tran
*Assistant Examiner* — Claire Rojohn, III
(74) *Attorney, Agent, or Firm* — King & Schickli, PLLC

(57) ABSTRACT

A fintube includes a body having a first fin, a second fin and a tube section. A first overlap fold is provided between the first fin and the tube section. The first overlap fold includes an open groove. A second overlap fold is provided between the second fin and the tube section. A seam includes a second overlap fold received and held in the groove of the first overlap fold. Methods for making a fintube are also disclosed.

14 Claims, 9 Drawing Sheets

(56) References Cited

U.S. PATENT DOCUMENTS

| | | | | |
|---|---|---|---|---|
| 4,428,420 A | * | 1/1984 | Blakely | 165/183 |
| 4,505,262 A | | 3/1985 | Eaton | |
| 5,960,790 A | | 10/1999 | Rich | |
| 6,009,936 A | * | 1/2000 | Kubota | F28F 1/12 165/181 |
| 2006/0108109 A1 | * | 5/2006 | Romero-Beltran | F28F 1/22 165/171 |
| 2009/0218085 A1 | * | 9/2009 | Rogers et al. | 165/180 |

OTHER PUBLICATIONS

Thermafin Holding, LLC—Welding Fintube Products; "Fintubes and Absorber Plates"; http://www.thermafin.com/welding.shtml; 1 page; 2006.
Thermafin Holding, LLC—Welding Fintube Products; "Protect your investment, insist on Thermafin"; http://www.thermafin.com/fintube.shtml; 1 page; 2006.
Thermafin Holding, LLC—Welding Fintube Products; "Thermafin Home"; http://www.thermafin.com/; 1 page; 2006.
Gary Reysa; "Full Wrap Tins from Henry"; Build it Solar; The Renewable Energy site for Do-It-Yourselfers; Feb. 21, 2012; pp. 1-6. http://www.builditsolar.com/Projects/WaterHeating/Fins/FullWrap.htm.

* cited by examiner

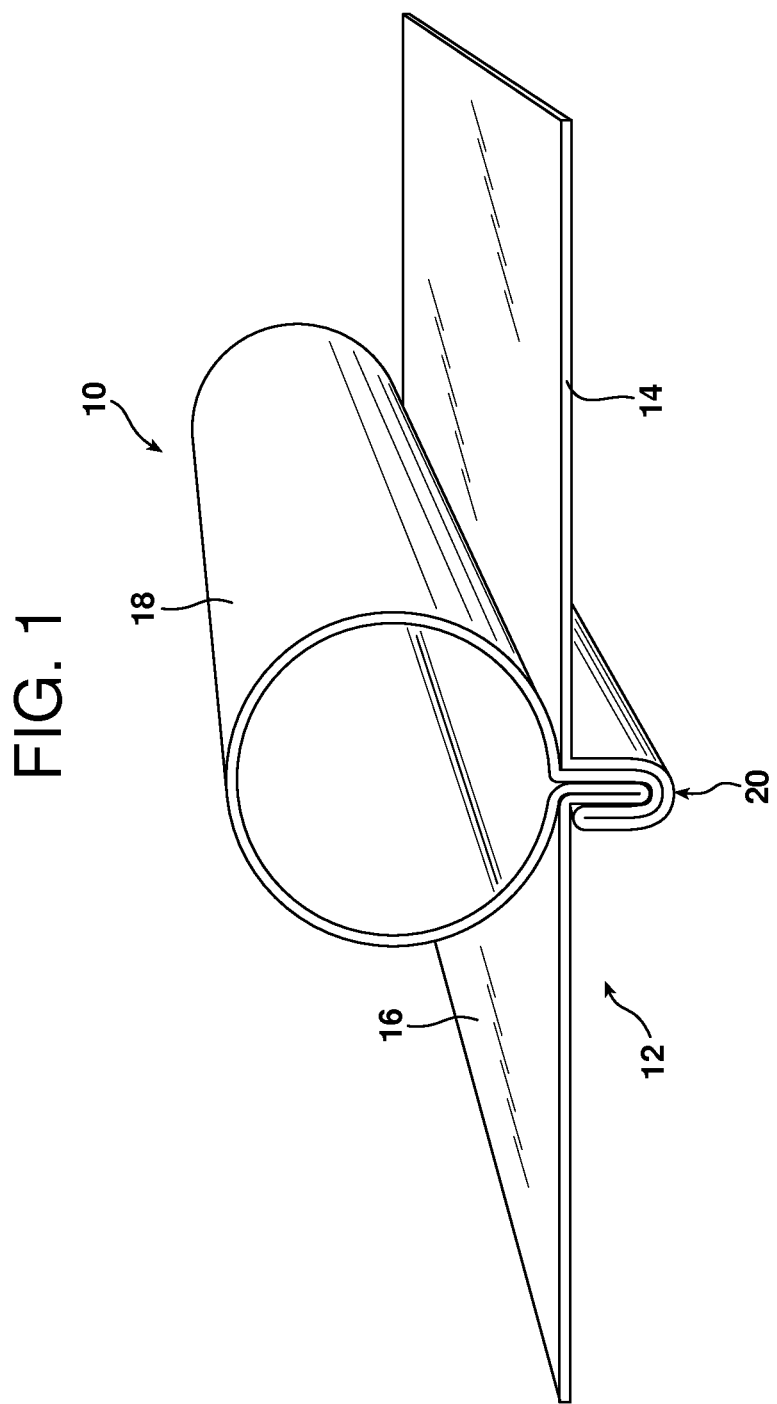

ONE-PIECE FINTUBE SOLAR HEATING ELEMENT

This patent application claims the benefit of U.S. Provisional Patent Application Ser. No. 61/463,156 filed on Feb. 14, 2011.

TECHNICAL FIELD

This document relates generally to the solar energy field, and more particularly, to a one-piece fintube solar heating element.

BACKGROUND SECTION

Fintubes for use as heat exchange elements, such as heating elements in solar energy systems including passive water heating systems, are known in the art. Fintubes generally include a tube for circulating a fluid for purposes of heat exchange and one or more fins for either absorbing heat from or dissipating heat into the environment. In solar water heating systems, the fins absorb heat from incident sunlight and that heat is then transferred from the fins to the tube and then from the tube to the fluid circulating in the tube. One such fintube is manufactured and sold by Thermafin Holding, LLC of Jacksonville, Fla.

Disclosed herein is a fintube with a unique and simple structure. The fintube has a one-piece construction and incorporates a seam structure (1) that may be relatively easily produced, (2) that provides a long and reliable service life without leaking and (3) that allows for excellent heat exchange between the fins and the tube through which the heat exchange fluid is being circulated. In addition, two methods are disclosed for making the fintube. Advantageously, these methods can be performed utilizing relatively simple forming equipment such as a press brake available in smaller shops around the country.

SUMMARY SECTION

A fintube comprises a body including a first fin, a second fin and a tube section. A first overlap fold is provided between the first fin and the tube section. The first overlap fold includes an open groove. A second overlap fold is provided between the second fin and the tube section. The fintube also has a seam including the second overlap fold received and held in the groove of the first overlap fold.

More specifically describing the fintube, the body is made from a single continuous sheet of material. That material may be selected from a group consisting of metal, aluminum and copper. The first overlap fold is four layers of material thick. In one embodiment the second overlap fold is two layers of material thick and the seam is six layers of material thick. In another embodiment the second overlap fold is four layers of material thick and the seam is eight layers of material thick. In either embodiment the seam extends continuously along a longitudinal axis of the body. This seam may be sealed in any appropriate manner.

In accordance with an additional aspect, a method is provided for forming a fintube from a single sheet of material. In a first embodiment, the method steps include: (a) forming a first overlap fold in the sheet material where the first overlap fold includes an open groove, (b) partially forming a tube and erecting a first fin, (c) forming a second overlap fold, (d) partially forming the tube and erecting a second fin and (e) inserting the second overlap fold into the groove so as to form a seam and complete forming of the tube.

In a second embodiment, the method of forming a fintube from a single sheet of material includes the steps of: (a) forming the sheet into a u-shape, (b) forming a first overlap fold on a first leg of the u-shaped sheet and forming a second overlap fold on a second leg of the u-shaped sheet, (c) doubling over the first and second overlap folds so as to form a first open groove in the first overlap fold and a second open groove in the second overlap fold, and (d) engaging the first and second overlap folds to form a seam while simultaneously erecting the first and second fins and forming a tube. Either method also further includes the sealing of the seam.

BRIEF DESCRIPTION OF THE DRAWINGS

The accompanying drawings incorporated herein and forming a part of the specification, illustrate several aspects of the fintube and its method of production and together with the description serve to explain certain principles of the fintube. In the drawings:

FIG. 1 is a perspective view illustrating the fintube;

Figure 2A:
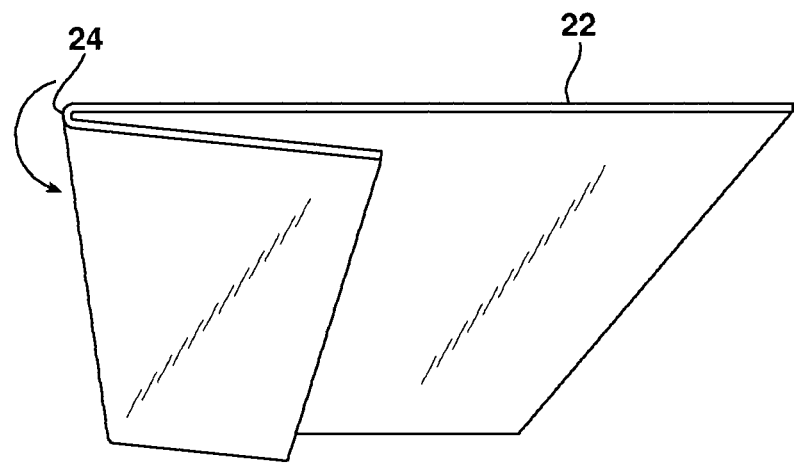
FIGS. 2A-2I illustrate step-by-step a first method for making the fintube.

Reference will now be made in detail to the present preferred embodiments of the fintube, examples of which are illustrated in the accompanying drawings.

DETAILED DESCRIPTION

Reference is now made to FIG. 1 illustrating a fintube 10 including a body 12. The body 12 includes a first fin 14, a second fin 16 and a tube section 18. The body 12 is formed from a single sheet of material such as metal, aluminum or copper. The first fin 14, the second fin 16 and the tube section 18 are all joined together at a seam 20 that runs continuously along the length of the longitudinal axis L of the fintube body 12.

The fintube 10 may be utilized as a heat exchange element in, for example, a solar water heater. In which a fluid is circulated through the tube section 18 for purposes of heat exchange. The first and second fins 14, 16 are positioned and directed or aligned so as to receive incident sunlight. That sunlight heats the fins 14, 16 which transfer heat through the seam 20 through the tube section 18 into the fluid being circulated through that section.

The fintube 10 may be utilized as a solar heating element in, for example, a passive solar water heater as said forth and described in U.S. Pat. No. 4,505,262 the full disclosure of which is incorporated herein by reference.

Figure 2B:
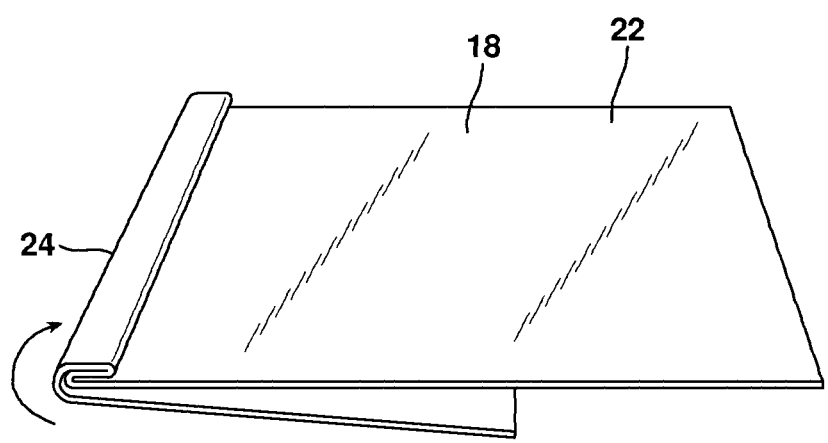
Figure 2C:
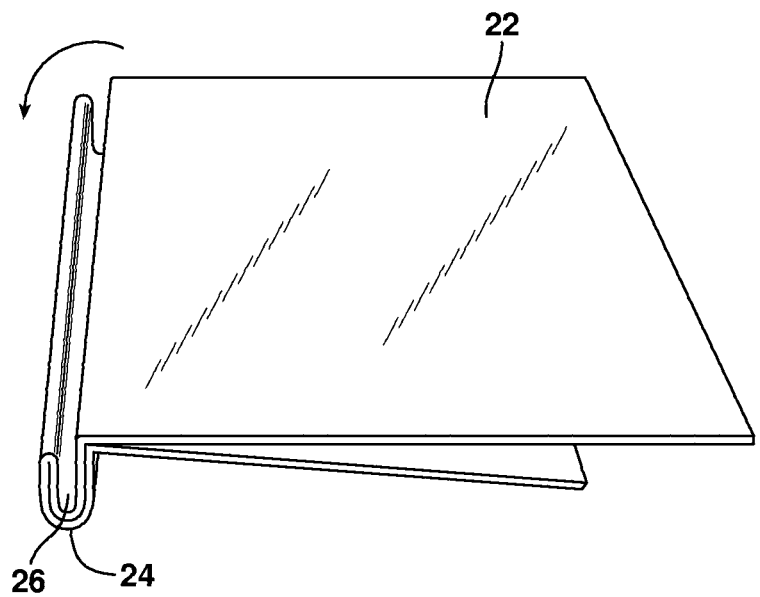

The fintube 10 may be made or manufactured in accordance with a method illustrated in FIGS. 2A-2I. As illustrated in FIGS. 2A-2I, the fintube 10 may be formed from a single sheet 22 of material. As illustrated in FIGS. 2A-2C, a first overlap fold 24 is formed in the sheet material 22. The first overlap fold includes an open groove 26. The first overlap fold 24 and open groove 26 are made by folding the first fin 14 over the portion 18 of the sheet material that will eventually form the tube section 18 (see FIG. 2A). That initial fold is then doubled over (see action arrows in FIG. 2B) and then folded back open (see action arrows in FIG. 2C) in order to form the open groove 26.

Figure 2D:
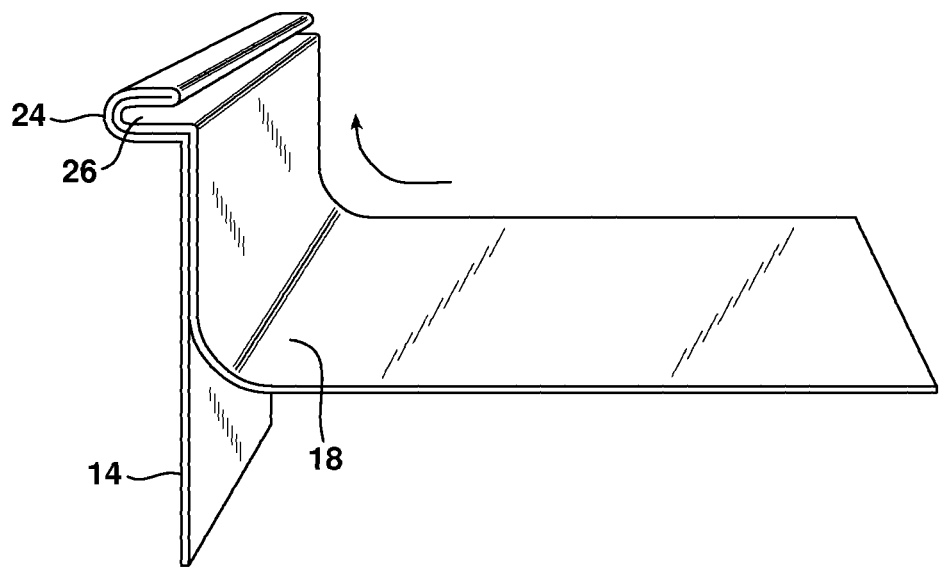
Figure 2E:
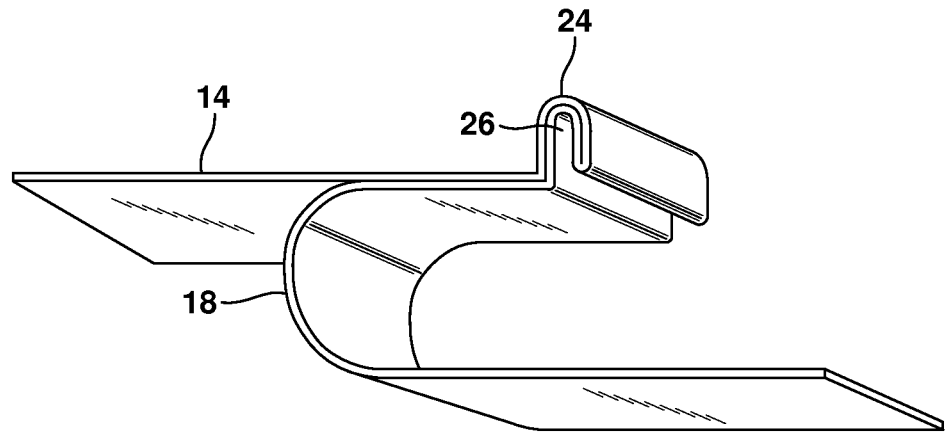
Figure 2F:
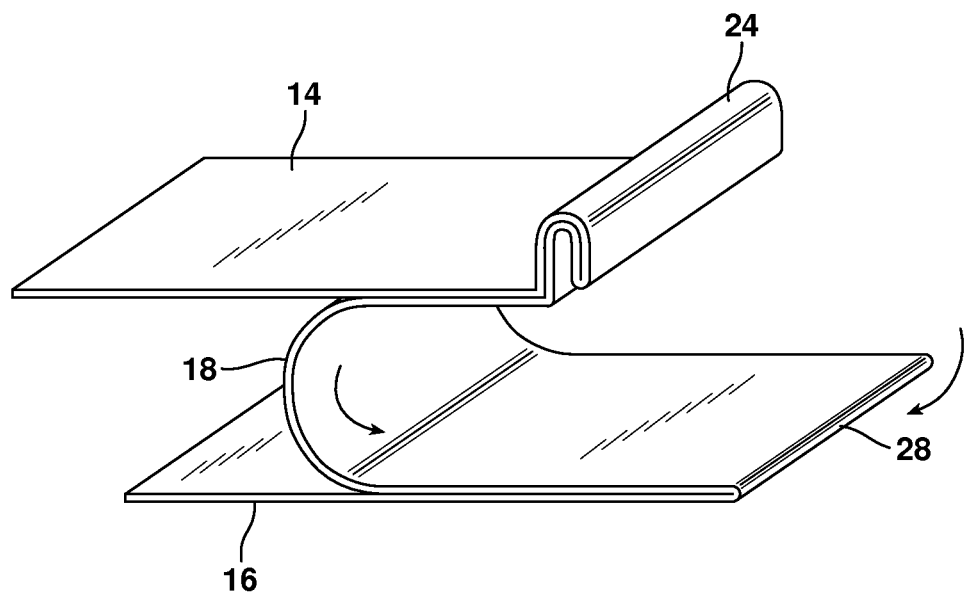
Figure 2G:
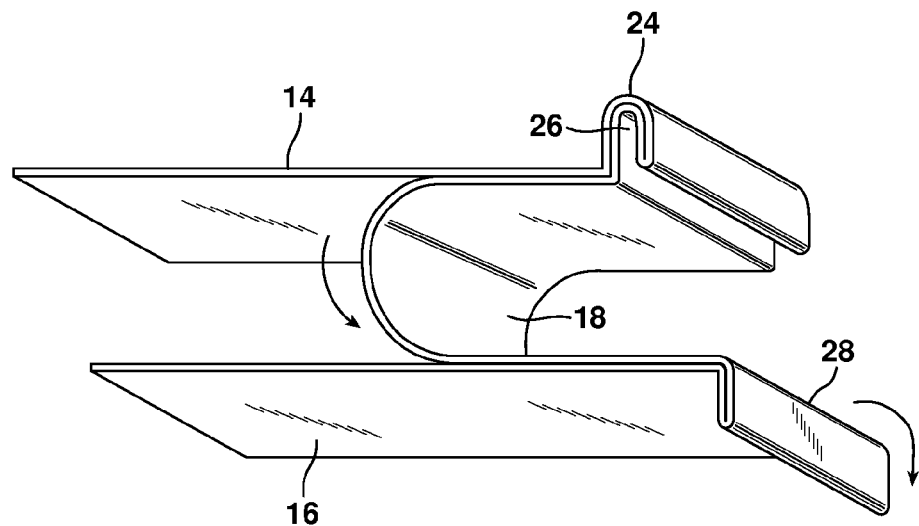
Figure 2H:
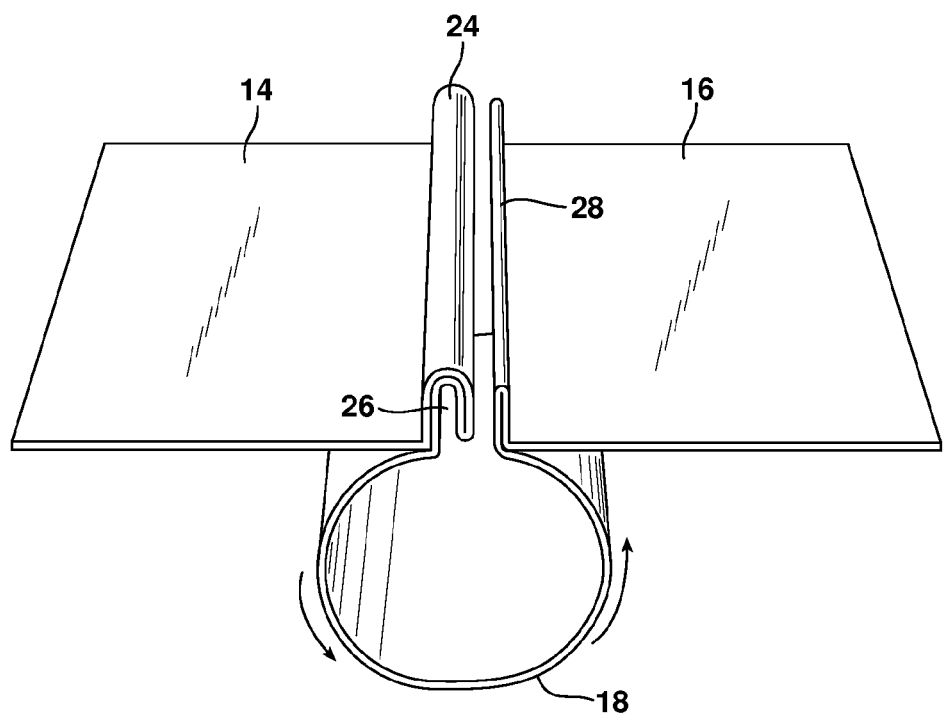
Figure 2I:
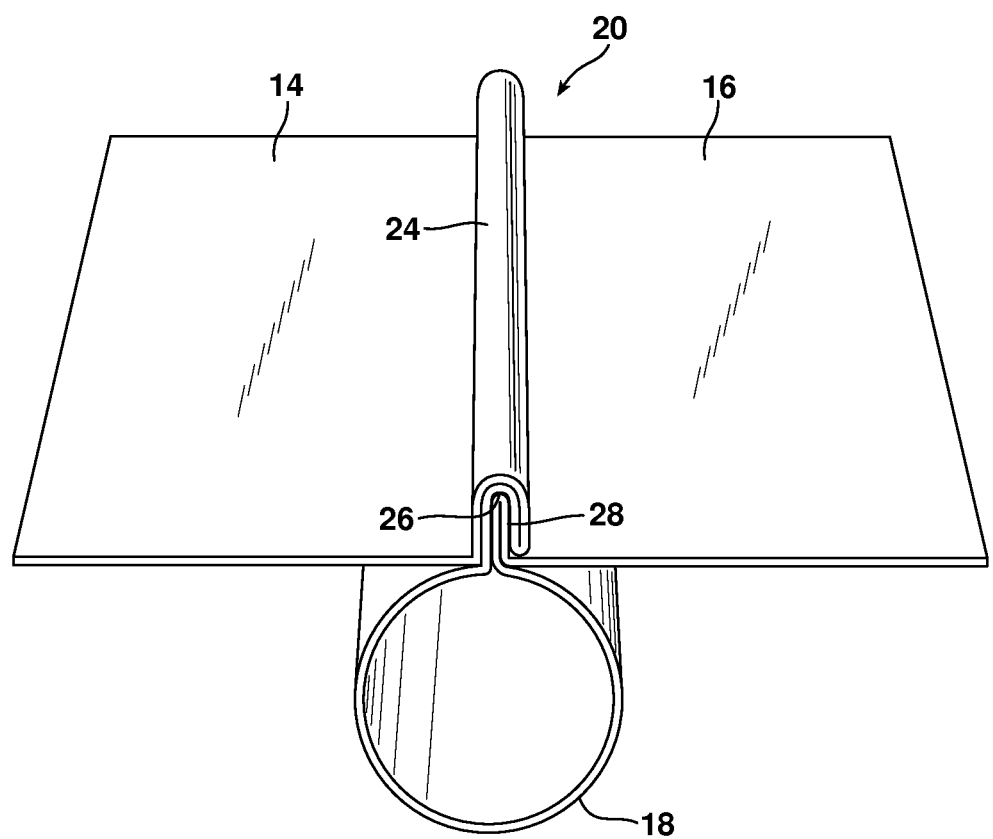

This step is then followed by the partial forming of the tube section 18 and the erecting of the first fin 14 (see particularly FIGS. 2D and 2E). Next is the forming of a second overlap fold 28 (see FIG. 2F). This is done by folding the second fin 16 so as to overlap a portion of the tube section 18 and then forming a 90° bend (see also FIG. 2G). This is then followed by partially folding the tube section 18 and erecting a second fin 16 (see particularly FIG. 2H). Next is the step of inserting the second overlap fold 28 into the open groove 26 of the first overlap fold 24 so as to form the seam 20 and complete the forming of the tube section 18 (See FIG. 2I).

The forming steps may be completed by any appropriate means including, for example, a press break or roll former. The seam 20 is also sealed in accordance with any appropriate process including, for example, riveting, cold welding or soldering. In accordance with the first method illustrated in FIGS. 2A-2I, the resulting fintube 10 includes a first overlap fold 24 that is four layers of material thick, a second overlap fold 28 that is two layers of material thick and a seam 20 that is six layers of material thick.

Figure 3A:
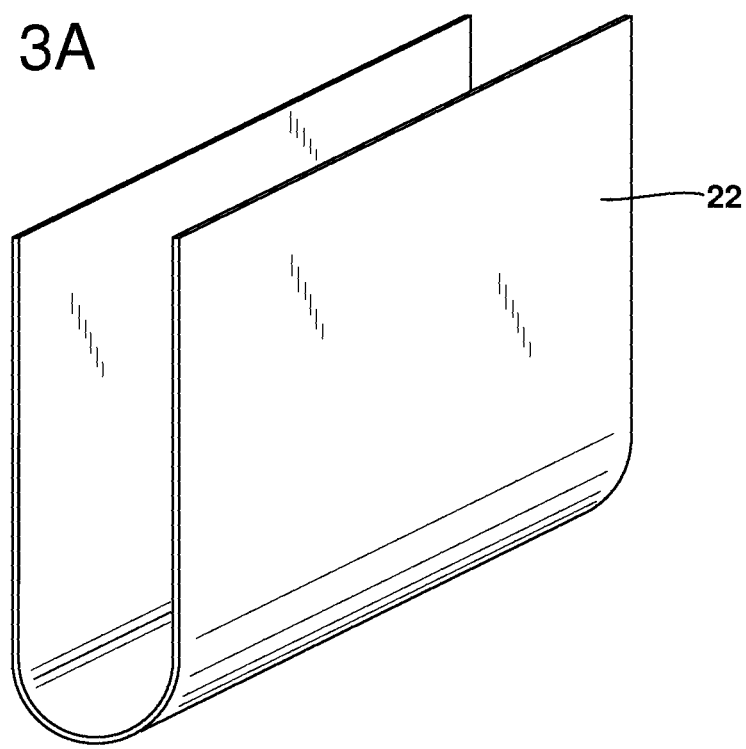
FIGS. 3A-3F illustrate step-by-step a second method for making the fintube.

A second method for making the fintube 10 is illustrated in FIGS. 3A-3F. As illustrated in FIG. 3A, the sheet material 22 is first formed into a u-shape. This is followed by forming a first overlap fold 24 on the first leg 30 of the u-shaped sheet 22 and forming the second overlap fold 28 on the second leg 32 of the u-shaped sheet. See FIG. 3B. Next is the doubling over of the first and second overlap folds 24, 28 so as to form a first open groove 34 in the first overlap fold 24 and a second open groove 36 in the second overlap fold 28 (see FIG. 3C).

This is then followed by the step of engaging the first and second overlap folds 24, 28 and first and second grooves 34, 36 to form the seam 20 while simultaneously erecting the first and second fins 14, 16 and forming the completed tube section 18. (See FIGS. 3D and 3E).

Figure 3B:
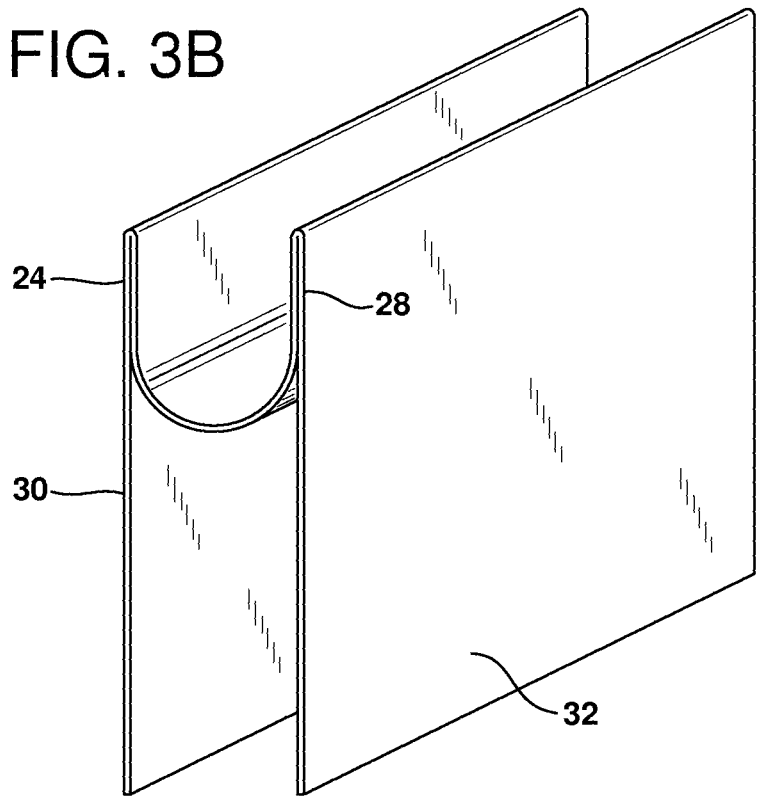
Figure 3C:
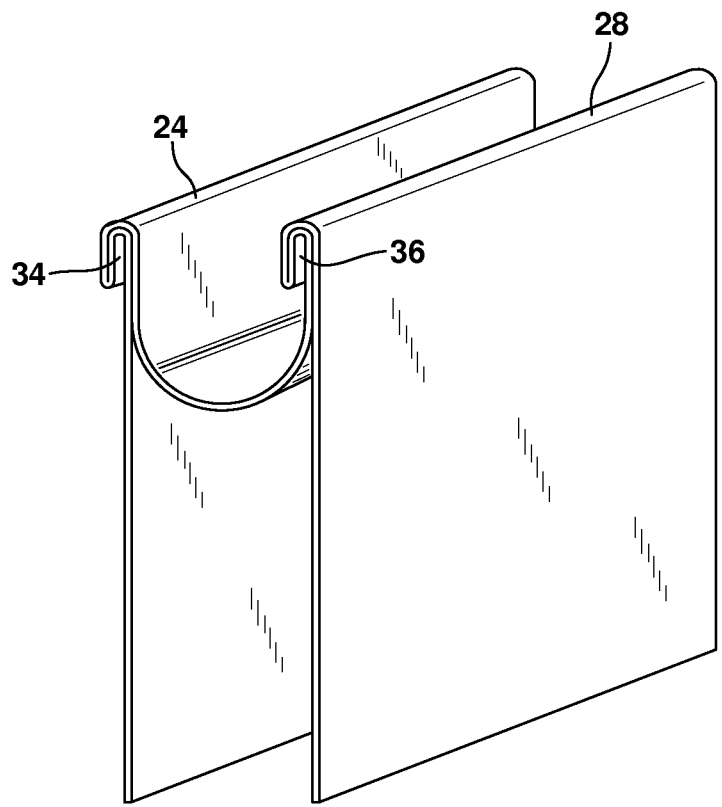
Figure 3D:
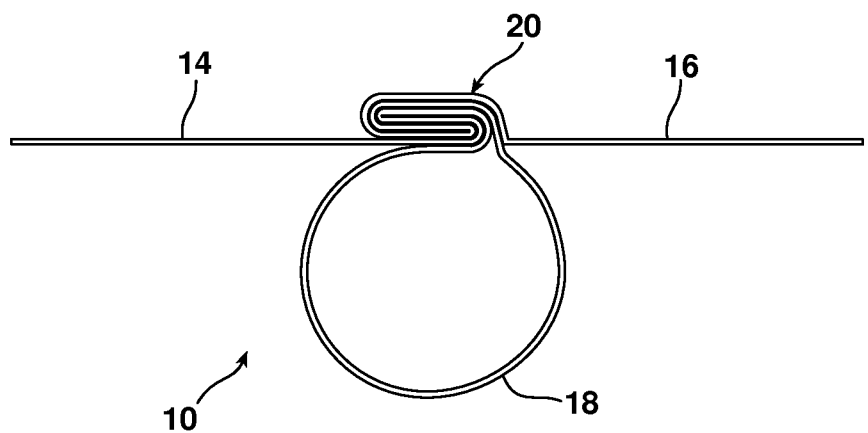
Figure 3E:
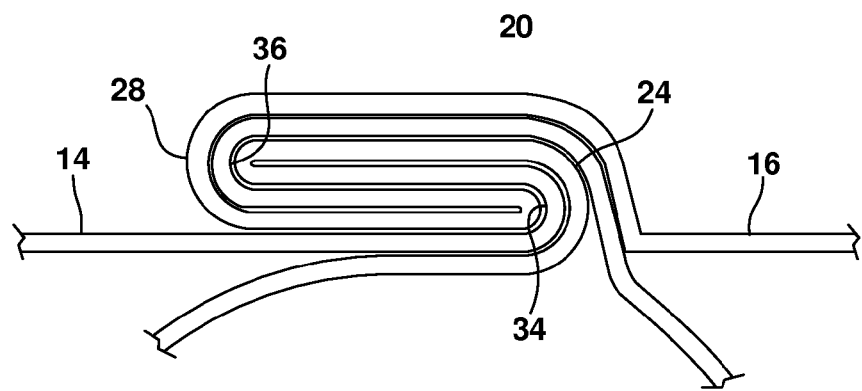
Figure 3F:
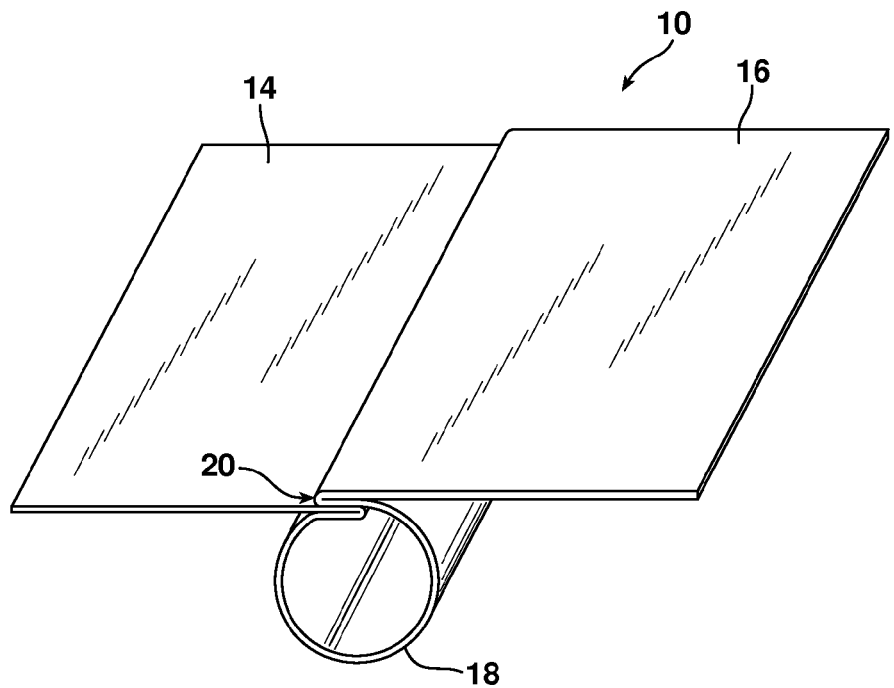

In accordance with this second method, the first overlap fold 24 is four layers of material thick, the second overlap fold 28 is four layers of material thick and the seam 20 is eight layers of material thick (see particularly FIG. 3E).

As with the first method, the second method illustrated in FIGS. 3A-3F may be performed using, for example, a press break or roll former. Further the sealing of the seam 20 may be completed in accordance with any appropriate process including, but not limited to, riveting, soldering and cold welding.

In accordance with yet another method, one completes the step noted above to go from the structure illustrated in FIG. 3A to the structure illustrated in FIG. 3B. Next one continues to form the tube section 18 until the fins 14, 16 one erected and the fins and the overlap folds 24, 28 all lie in the same plane. Thus, one goes directly from FIG. 3B to FIG. 3F. The resulting seam 20 of four layers of material may then be rivoted and soldered to seal the seam.

The foregoing description of preferred embodiments of the fintube and the method of making the same have been presented for purposes of illustration and description. It is not intended to be exhaustive or to limit the fintube and methods to the precise form disclosed. Obvious modifications or variations are possible in light of the above teachings. The embodiments were chosen and described to provide the best illustration of the principles of the fintube and its method of production and its practical application to thereby enable one of ordinary skill in the art to utilize the fintube and method of production in various embodiments and with various modifications as are suited to the particular use contemplated. All such modifications and variations are within the scope of the claims in this document when interpreted in accordance with the breadth to which they are fairly, legally and equitably entitled. The drawings and preferred embodiments do not and are not intended to limit the ordinary meaning of the claims in their fair and broad interpretation in any way.

What is claimed:

1. A passive fintube solar heat absorbing element, comprising; a body that is a single continuous sheet of material, said body including a first fin, a second fin and an annular tube section, wherein said first fin, said second fin and said tube section have a uniform thickness;
   said first fin is flat and at a first end of the single continuous sheet and said second fin is flat and at a second end of the single continuous sheet;
   a first overlap fold that is on the single continuous sheet directly connecting said first fin and said tube section, wherein said first overlap fold includes an open groove;
   a second overlap fold that is on the single continuous sheet directly connecting said second fin and said tube section and held within the open groove; and
   a sealed seam including said first and second overlap folds.

2. The fintube of claim 1, wherein said first overlap fold is four layers of material thick.

3. The fintube of claim 2, wherein said second overlap fold is two layers of material thick.

4. The fintube of claim 3, wherein said seam is six layers of material thick.

5. The fintube of claim 4, wherein said seam extends continuously along a longitudinal axis of said body.

6. The fintube of claim 5, wherein said seam is sealed.

7. The fintube of claim 1, wherein said material is selected from a group consisting of metal, aluminum and copper.

8. The fintube of claim 2, wherein said second overlap fold includes a second open groove.

9. The fintube of claim 8, wherein said seam includes said first overlap fold received and held in said second open groove of said second overlap fold.

10. The fintube of claim 9, wherein said second overlap fold is four layers of material thick.

11. The fintube of claim 10, wherein said seam is eight layers of material thick.

12. The fintube of claim 11, wherein said seam extends continuously along a longitudinal axis of said body.

13. The fintube of claim 12, wherein said seam is sealed.

14. The fintube of claim 13, wherein said material is selected from a group consisting of metal, aluminum and copper.

* * * * *